US008200697B1

(12) United States Patent
Kraybill

(10) Patent No.: US 8,200,697 B1
(45) Date of Patent: Jun. 12, 2012

(54) CLIENT INTEGRATED ARTWORK/FILE REPOSITORY SYSTEM

(75) Inventor: Jeremy Kraybill, Austin, TX (US)

(73) Assignee: Boundless Network, Austin, TX (US)

( * ) Notice: Subject to any disclaimer, the term of this patent is extended or adjusted under 35 U.S.C. 154(b) by 595 days.

(21) Appl. No.: 12/021,466

(22) Filed: Jan. 29, 2008

(51) Int. Cl.
*G06F 17/30* (2006.01)

(52) U.S. Cl. ........................................................ 707/783

(58) Field of Classification Search .................. 707/802, 707/783, 999.001
See application file for complete search history.

(56) References Cited

U.S. PATENT DOCUMENTS

| | | | |
|---|---|---|---|
| 5,918,220 A | 6/1999 | Sansone et al. | |
| 6,819,919 B1* | 11/2004 | Tanaka | 455/414.1 |
| 2003/0172007 A1 | 9/2003 | Helmolt et al. | |
| 2004/0078430 A1 | 4/2004 | Aubert et al. | |
| 2004/0103280 A1* | 5/2004 | Balfanz et al. | 713/169 |
| 2005/0182776 A1* | 8/2005 | Yennie | 707/100 |
| 2005/0209732 A1 | 9/2005 | Audimoolam et al. | |
| 2006/0149727 A1* | 7/2006 | Viitaharju | 707/5 |
| 2006/0191020 A1* | 8/2006 | Miller | 726/28 |
| 2006/0294192 A1* | 12/2006 | Mao et al. | 709/213 |
| 2007/0226368 A1* | 9/2007 | Strickland | 709/243 |
| 2007/0239299 A1 | 10/2007 | Milne et al. | |
| 2008/0082408 A1* | 4/2008 | Santa Ana | 705/14 |
| 2008/0091704 A1* | 4/2008 | Yennie | 707/102 |
| 2008/0155588 A1* | 6/2008 | Roberts et al. | 725/34 |
| 2008/0228763 A1* | 9/2008 | Wong | 707/5 |
| 2009/0187982 A1* | 7/2009 | Balfanz et al. | 726/9 |

OTHER PUBLICATIONS

Landvater and Gray, "MRP II Standard System: A Handbook for Manufacturing Software Survival", description downloaded from http://www.amazon.com Mar. 25, 2008, pp. 1-9.
Office Action issued in U.S. Appl. No. 11/957,620, mailed Jun. 23, 2010, 19 pages.
Office Action issued in U.S. Appl. No. 11/957,620, mailed Mar. 31, 2011, 16 pgs.

* cited by examiner

*Primary Examiner* — John R. Cottingham
*Assistant Examiner* — Mohammed R Uddin
(74) *Attorney, Agent, or Firm* — Sprinkle IP Law Group

(57) ABSTRACT

Systems and methods for controlling file access. A data structure is provided which includes a set of files (artwork for a promotional products ordering system in some embodiments) and a set of user accounts. Each file and each account has associated arbitrary classifiers associated therewith. When account classifier(s) match file classifier(s), the corresponding users (salespersons in some embodiments) may access the files. The matching files may be Listed for the users. The arbitrary classifiers can be nominal key:value pairs. A system is provided which includes a network, computers, and memory which contains such a data structure. The system may include a Web based file access interface. A method is provided in which arbitrary classifiers are associated with files and users. Users with classifiers which match a file classifier are allowed access to the corresponding file. An administrator may upload files to a shared repository in the memory.

18 Claims, 3 Drawing Sheets

CLIENT INTEGRATED ARTWORK/FILE REPOSITORY SYSTEM

TECHNICAL FIELD OF THE INVENTION

Embodiments of the disclosure relate generally to data sharing and more particularly to systems and methods for controlling access to shared files stored on a products ordering network.

BACKGROUND

Promotional products merchants often allow customers to provide or select artwork with which to decorate the blank goods underlying the promotional products. The artwork can include nationally famous trademarks, service marks, company and organizations names, etc. Other types of artwork include thematic materials such as regional and local identifiers (e.g., "Austin, Tex."), logos, symbols, and the like. Some of the artwork may be appropriate to selected groups of customers or salespeople within the merchant. For instance, the city name "Austin" might be appropriate to use for customers in the central Texas area. In some cases, only select customers or sales people might be allowed use of a piece of particular artwork. For example, if a customer develops its own artwork, the customer may want only the sales person who "owns" their account to use that artwork.

In many organizations, sharing information tends to increase efficiency. For instance, within a promotional products merchant, many sales persons may want access to a variety of artwork files. Commonly sought artwork files can include slogans, graphics, commonly used terms or sayings, etc. Moreover, many sales people work collaboratively sharing ideas and improving upon those which they learn of through collaboration. For example, one sales person might alter and improve a graphical design created by another sales person (or customer).

Another consideration which complicates the situation is that sales personnel tend to be non-technical in nature. Thus, sophisticated file sharing algorithms that might be satisfactory in some applications may distract the sales team from their core competency: helping customers and efficiently identifying and ordering products desired by the customers.

SUMMARY OF THE INVENTION

Thus, a need exists to allow access to shared data while controlling access to that same data without unduly complicating access to the data. Embodiments of the disclosure provide systems and methods for controlling access to shared data that eliminates, or at least substantially reduces, the shortcomings of prior art systems and methods of controlled access.

In some embodiments, a system for sharing files is provided in which the files and users are marked with arbitrary classifiers to indicate how the files are to be shared. In some embodiments, only those users who have at least one classifier matching a classifier of a particular file may have access to that file. The system can be applied to electronic artwork files used in promotional product specifications. Either an administrative user, or an end user (a sales person in some embodiments), or a combination thereof can upload the files to a shared repository within the system. The system can make these files available to others within the sales organization; to others within the larger organization with which the sales organization is associated; those users associated with a target customer account; or a subset of users. In some embodiments, systems and methods provided can be based on the Internet and the World Wide Web.

The classifiers may reflect an attribute or classification of one or more of the users and the files. Some classifiers may be nominal key:value pairs reflecting an ownership, geographic, or industry classification. In some embodiments, a classifier might reflect a particular company name such as:

company:Boundless Network

Classifiers can be associated with a sales person owning an account.

In some embodiments, the terms "city:Austin" and "industry:healthcare" could be classifiers in the system. However, the classifiers "cityaustin" (missing ":" intentional) and "indstry:healthcare" (misspelling intentional) may be used as classifiers in the same system. The latter two classifiers illustrate that classifiers of some embodiments are arbitrary with neither pre-determined formatting nor pre-determined "keys" or "values" associated therewith. The classifier "cityaustin" illustrates the arbitrary nature of the syntax (or lack thereof) by omitting the ":" that may be required by true key:value pairs. The classifier "indstry:healthcare" illustrates the arbitrary nature of the key names by the misspelled variant of the word "industry." In some embodiments, an arbitrary classifier can be "industry:heathcare" which illustrates the arbitrary nature of the values of the key:value pairs by misspelling "healthcare." In some embodiments, the classifiers are freeform. In some embodiments, the classifiers are unstructured.

In one embodiment, an administrator such as a certain sales person, supervisor, manager, etc. can assign each user and each file a set of classifiers which may be possibly unique to that user or file. The administrator could assign each classifier to a set of files and to a set of users to control which users can access the files. When new users, files, or classifiers arise, the new user, files, or classifiers can be associated with each other as desired. Suppose that, in an embodiment, a new company "companyABC" establishes an account with the owner of the system. Some actions the administrator could take are to create a new classifier "company:companyABC" and assign it to an artwork file provided by companyABC and to one or more sales persons who are to service the companyABC account. If companyABC has operations in two cities such as Austin, Tex. and Dallas, Tex., the administrator could associate pre-existing classifiers such as city:Austin and city:Dallas to the sales persons who are associated with Austin and Dallas. These sales persons can then access the artwork file for Company ABC if these files also have city:Austin and city:Dallas classifiers associated therewith.

Embodiments of the disclosure can facilitate collaborative use of information such as electronic artwork files. Embodiments also allow controlled access to shared data without requiring a complex architecture or technical knowledge on the part of its users and administrators. Embodiments also require little labor, time, or skill to implement while imposing little, or no, overhead, burden, or performance penalty on the systems in which they are implemented.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

Figure 1:
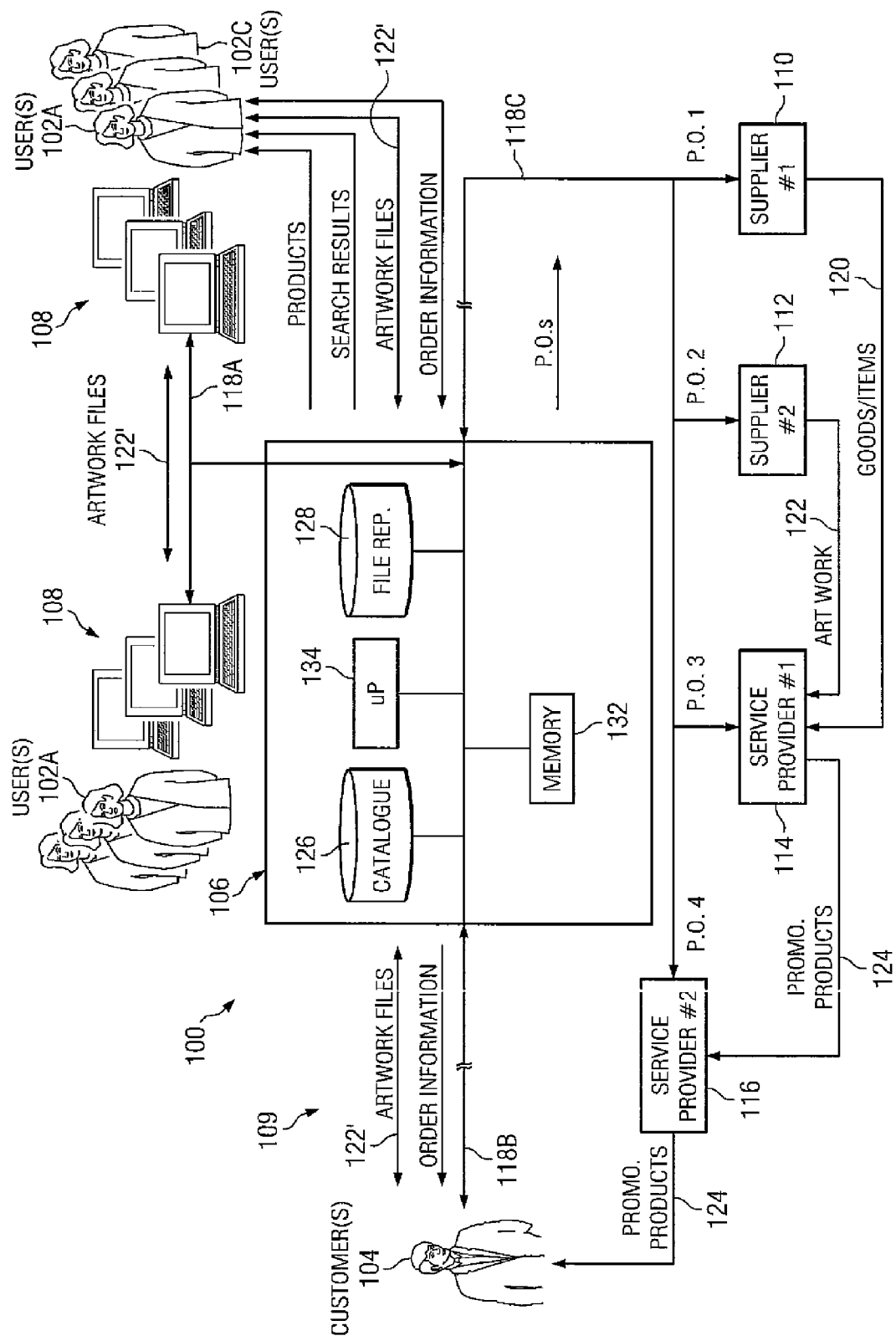
FIG. 1 illustrates a file sharing system.

Preferred embodiments of the disclosure are illustrated in the FIGURES, like numerals generally being used to refer to like and corresponding parts of the various drawings. Embodiments of the disclosure provide systems and methods for controlling access to shared files stored on a products ordering network.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, ratio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. In some embodiments, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. In some embodiments, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments, which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

With reference now to FIG. 1, system 100 for sharing promotional product artwork files is illustrated. System 100 may be employed by users 102 to take orders for promotional products from customers 104. System 100 typically includes a computer 106 and interfaces 108 and 109 for users 102 and customers 104, respectively. System 100 further includes one or more suppliers 110 and 112 and service providers 114 and 116. FIG. 1 also shows network 118 (the Internet or another electronic communications network in some embodiments) which may be utilized to provide the interfaces for users 102, customers 104 and suppliers 110, 112, 114, and 116.

Generally, system 100 may be utilized so that user 102 may arrange for items 120 selected by customer 104 to be shipped to service provider 114 so that artwork 122 (also selected by customer 104 in some embodiments) may be added to item 120. In some embodiments, the resulting promotional products 124 (or decorated item 120 in some embodiments) may then be shipped to another service provider 116 where additional services may be performed on promotional products 124. Once these subsequent services, if any, have been performed, system 100 allows finished promotional products 124 to be shipped to customer 104.

As FIG. 1 shows, computer 106 may include catalogue 126, file sharing database or repository 128, memory 132, and processor 134. Memory 132 can be used to store catalogue 126, file repository 128, and the software instructions which operate computer 106 or which perform other functions associated with system 100. However, catalogue 126 and file repository 128 could be located in another computer or a remote storage facility that communicates with computer 106. Thus, other system configurations are possible and fall within the scope of the disclosure. Interface 109 allows customers 104 to make item selections from catalogue 126 and to send artwork to system 100. Network portion 118C interfaces with suppliers 110, 112, 114, and 116 and can allow purchase orders, artwork, and "exceptions" or special instructions to be transmitted to suppliers 110, 112, 114, and 116.

At interface 108, information may flow to, and from, users 102 as depicted. More particularly, system 100 may operate to display the selections of customers 104 to users 102 who may be assisting customers 104 with purchases. Additionally, interface 108 may display information regarding orders, products, product searches, and artwork for users 102. Similarly, interface 109 can display information from catalogue 126, sales orders, invoices, and new or modified artwork from users 102 for customers 104. Thus, information concerning an order generally flows from customer 104 to user 102 (a sales person in some embodiments) and then to suppliers 110, 112, 114, and 116 with feedback to customer 104 in the form of invoices, bills, sales acknowledgements, etc. Information regarding artwork may flow between users 102 and customers 104.

In any event, information in system 100 may be made available to users 102, customers 104, and processor 134 on an appropriately selective basis. Generally, and still with reference to FIG. 1, customer 104 may view catalogue 126 and make selections of items (including indicating the desired quantities of the items) which customer 104 wishes to order. User 102 may review the transaction and assist customer 104 with product selections via interface 108. Thereafter, system 100 can issue purchase orders such as P.O.s 1-4 (purchase orders can be documents authorizing a seller to ship goods or provide services) to appropriate suppliers 110, 112, 114, and 116 as illustrated by FIG. 1. Additionally, system 100 may generate sales acknowledgments, sales orders, and bills or invoices for customer 104. Usually, system 100 will generate several P.O.s 1-4 but only one sales order for a given customer selection. Indeed, it has been found that system 100 may be advantageously used to drop-ship promotional products 124 and other goods to various customers 104.

Consider the case in which embroidered pieces of artwork 122 (a company logo in some embodiments) are to be added to a quantity of goods 120 (shirts in some embodiments). In many cases customer 104 may already have selected artwork 122. In these cases customer 104 can send artwork file 122' to user 102 for inclusion in the order. In other cases customer 104 may have only a vague idea, or no idea at all, regarding artwork 122. In such case, customer 104 can send a file 122' containing the information they do have about artwork 122 to user 102. User 102 can modify artwork file 122' and send the results back to customer 104 for approval. In some embodiments, user 102 can select an artwork file 122' from artwork repository 128 and with, or without, modification send it to customer 104 for consideration. A certain user 102A can access an artwork file 122' created by another user 102B, modify it, and send it to customer 104. In some embodiments, users 102A and 102B and customer 104 can collaborate in such a manner as to arrive at a version of artwork file 122' that is acceptable to customer 104.

At some point, customer 104 may make a product selection at interface 109. Once verification of the order is received from customer 104, the appropriate purchase orders (P.O.s 1-4 in some embodiments) may be sent as illustrated in FIG. 1. Here P.O. 1 is sent to shirt supplier 110 while P.O. 2 is sent to embroidery supplier 112 as is the artwork 122 chosen by customer 104. Artwork 122 can be electronic file 122'; can be stored in system 100; can be delivered via facsimile machine; or can be a physical sample provided by customer 104 (via mail, hand delivery, or other delivery service). Both suppliers 110 and 112 ship their respective goods 120 and 122 (when ready) to first service provider 114 (an embroiderer in some embodiments). In turn, embroiderer 114 adds embroidered artwork 122 to blank shirt 120 to create promotional shirt 124 in accordance with P.O. 3. In the case shown, customer 104 has also selected that a subsequent service be performed on promotional products 124. Customer 104 might want promotional product 124 gift wrapped or added to a kit. Thus, P.O. 4 indicates to gift wrapper or kitter 116 to perform the appropriate service with promotional shirt 124.

With regard to memory 132, memory 132 can contain historical data regarding past customer selections, purchase orders, sales orders, shipment plans, and supply chains. Memory 132 may also contain data related to items 120, artwork 122, techniques to add artwork to various items 120, suppliers 110 and 112, service providers 114 and 116, and items 120 and techniques that suppliers and providers provide, etc. Memory 132 can also contain file repository 128. File repository 128 may contain artwork files 122' created and modified by users 102 and customer 104. File repository may also include a data structure (to be discussed with reference to FIG. 3) which facilitates sharing of files 122'.

Figure 2:
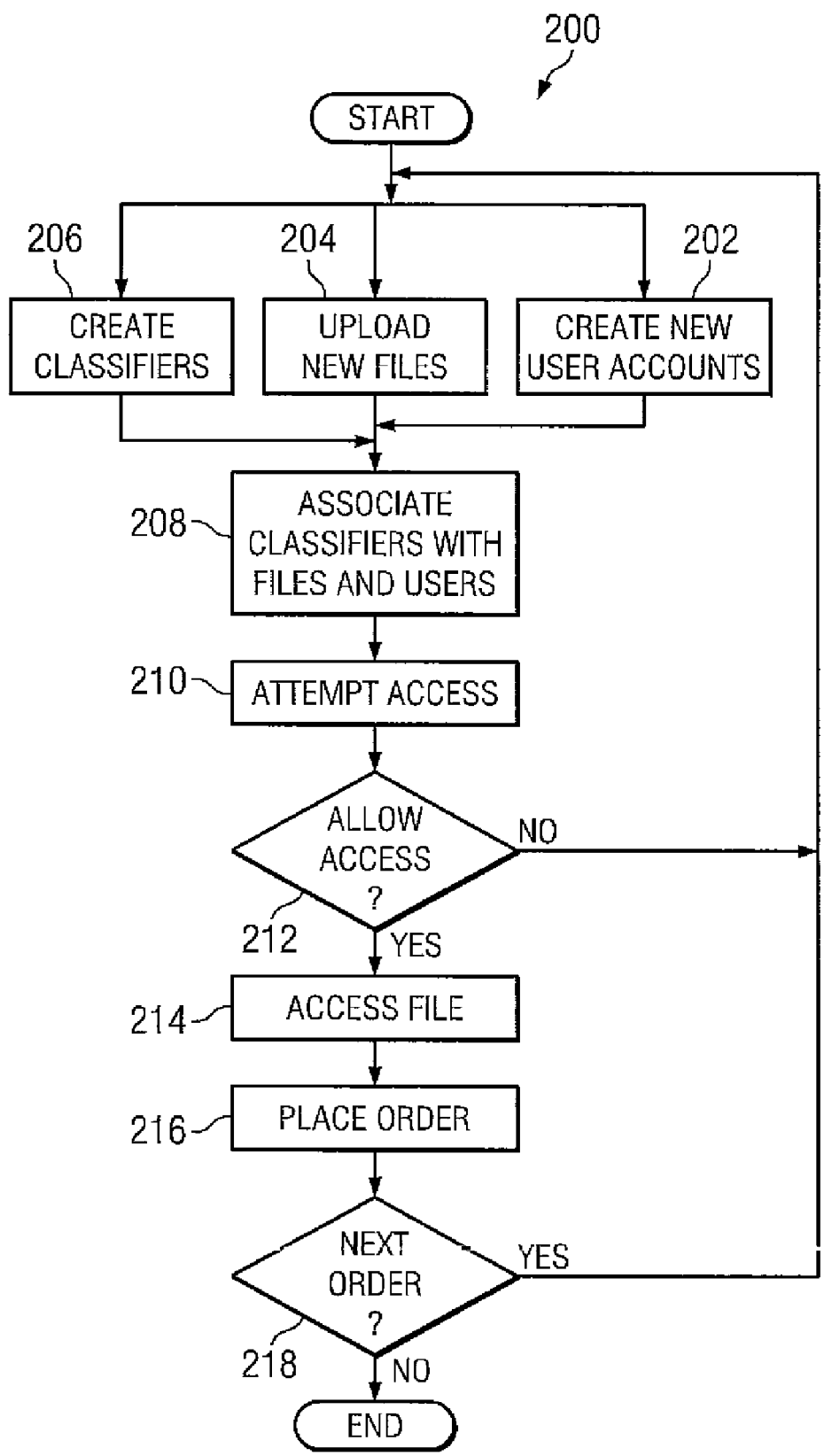
FIG. 2 depicts a method of sharing files.

With reference now to FIG. 2, a flowchart illustrates method 200 for controlling access to artwork files 122'. Method 200, in some embodiments, begins at step 202 in which an administrator or other user 102 creates an account for each of the users 102 of system 102. Artwork or other types of files 122' can then be uploaded into artwork repository 128 from a variety of sources at step 204. Sources for artwork files 122' can be any user 102, any customer 104, any supplier 110, 112, 114, and 116, catalogue 126, etc. At step 206, a user 102 who may be an administrator, supervisor, manager, etc. creates one or more classifiers such as user classifiers 322 or file classifiers 326 of FIG. 3. Classifiers 322 and 326 may be unstructured, free-form, or arbitrary. In some embodiments, classifiers 322 and 326 are disjunctive with no hierarchy, dependence, relationship, or class or object inheritance (except that which may be desirable) associated therewith. Any hierarchy, dependence, or class or object inheritance can be made by convention or implication only; the system itself does not have to maintain such relationships. In some embodiments, the user of the system may decide that all customers with classifier "city:Austin" also receive classifier "state:Texas", but such an association need not bet maintained by the system. Classifiers 322 and 326 of some embodiments differ, in part, from previous access control approaches because they are neither permission (read and write permissions assigned to a user 102 in some embodiments) nor group permission (defined by a department or type of user 102 in some embodiments) related. Classifiers 322 and 326 can take the form of a key:value pair such as city: Austin, industry:healthcare, company:companyABC, etc. In some embodiments, no technical formatting rules, syntax, or the like is levied on classifiers 322 and 326. One benefit of creating arbitrary classifiers 322 and 326 is that user 102 (an administrator in some embodiments) who creates them need not have, but can have, a technical background. Arbitrary classifiers 322 and 326 may then be associated with users 102 and artwork files 122' respectively as is desired at step 208.

When system 100 has been in use for some time, a population of classifiers 322 and 326 may be in existence. In such embodiments, classifiers 322 and 326 may be manually selected and associated with user accounts and files 122' as desired. Some embodiments provide the administrator or other user 102 a listing of classifiers 322 and 326 in system 100. System 100 can display a listing of classifiers 322 and 326 assigned to each user 102 and file 122' although classifiers 322 and 326 may be hidden from the users 102 (except, in some embodiments, an administrator). In some embodiments, classifiers 322 and 326 are assigned in a logical manner so that users 102 who have a need to access particular files 122' can do so and those who have no need to do so cannot. In some embodiments, those users 102 who service a particular company's account may have access to files 122' associated with that account by way of having classifier 322 assigned to them which is, or will be, also associated with those files 122'. Other users 102 who do not necessarily have a need to access files 122' associated with the company may be denied having the appropriate classifier 322 associated with their account. One or more files 122' may have many file classifiers 326 associated therewith to allow access to file 122'. In some embodiments, such files 122' can have compound sets of classifiers 326. In some embodiments, file classifiers 326 allow many users 102 to access one or more files 122'.

User 102A could have classifier 322 such as "company: Boundless Network" associated with user's 102A account whereas user 102B does not in some embodiments. File 122' containing a company's logo, such as logo 400 for Boundless Network (a promotional products merchant), could have arbitrary classifiers 326 such as "company:Boundless Network" and "city:Austin" associated with it. User 102C could have classifier 322 "city:Austin" associated with user's 102C account whereas the account for user 102B has only classifier 322 "city:Dallas" associated therewith.

At some point, at step 210 in some embodiments, one or more users 102 may attempt to access files 122' in artwork repository 128. If user 102A attempts to access file 122' containing, logo 400 in some embodiments, system 100 can compare all classifiers 322 associated with the account of user 102A with the classifiers 326 associated with file 122'. When system 100 finds at least one matching pair of classifiers 322 and 326, system 100 allows user 102A access to file 122'. Because both file 122' and the account for user 102A have classifier 322 and 326 "company:Boundless Network" associated therewith, in some embodiments, system 100 can allow user 102A access to file 122'. If user 1028 attempts to access file 122' system 100 can deny user 1028 access since the account for user 102B, in some embodiments, only has classifier 322 "city:Dallas" associated with it and file 122' has no matching classifier (since it has only classifiers "company: Boundless Network" and "city:Austin" associated with it). When user 102C attempts to access file 122' system 100 can grant user 102C access since both the account for user 102C and file 122' have classifier 322 and 326 "city:Austin" associated therewith.

In some embodiments, user 102B, having had access denied, may request that classifier 322 "company:Boundless Network" or "city:Austin" be associated with the account for user 102B as indicated by step 212 which shows that user 102B can do so by returning to steps 202, 204, 206, or 208 as desired. In some embodiments, user 102B can request that a new classifier 322 and 326 be created at step 206 and associated with both the account for user 1028 and file 122'.

Users 102A and 102C, with access granted at step 212, can proceed to step 214. At step 214 users 102A and 102C can access file 122'. Users 102A and 102C can view, copy, modify, transmit, etc. file 122' as desired. It is also possible that users 102A and 1020 may collaborate with each other, with customer 104, with others, or any combination thereof to modify logo 400 in file 122'. Once customer 104 authorizes use of logo 400 (contained in file 122' in some embodiments), user 102A or 102C can place an order using artwork file 122' at step 216. At any convenient time, users 102 can proceed to another order at step 218, in which case, selected portions of method 200 may repeat. Otherwise, users 102 can terminate their session at step 218.

Figure 3:
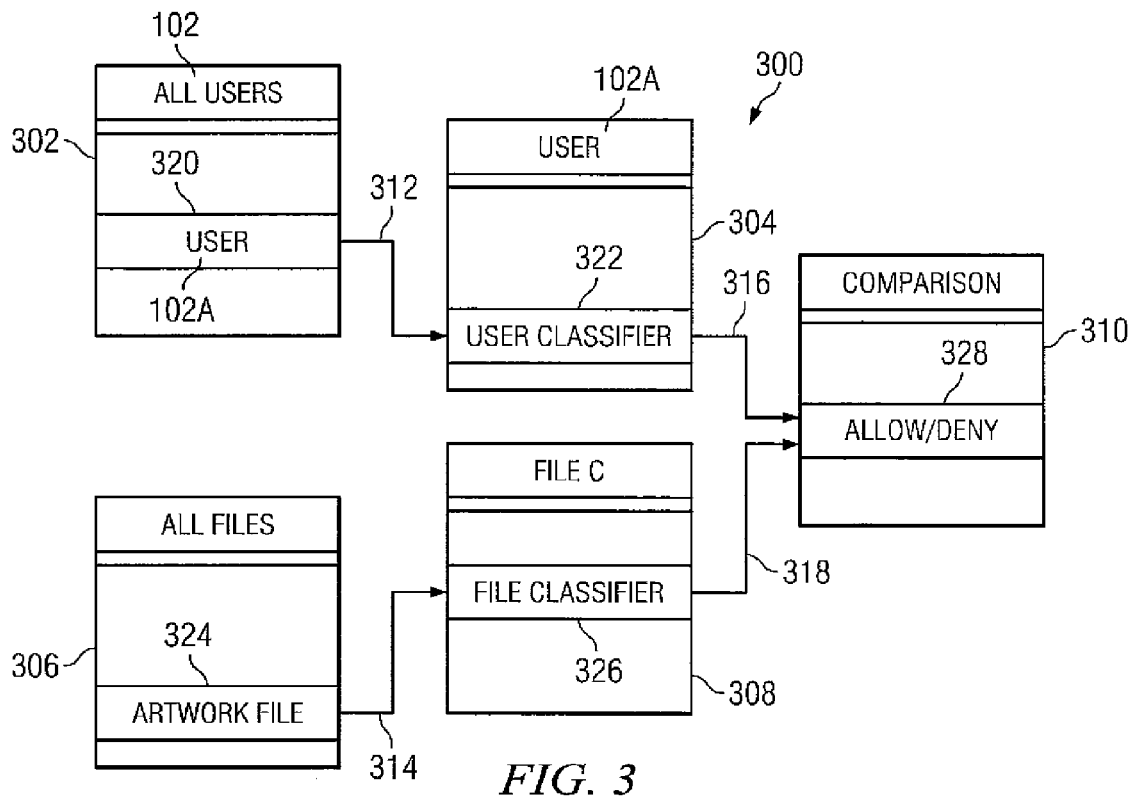
FIG. 3 illustrates a data structure for sharing files.
Figure 4:
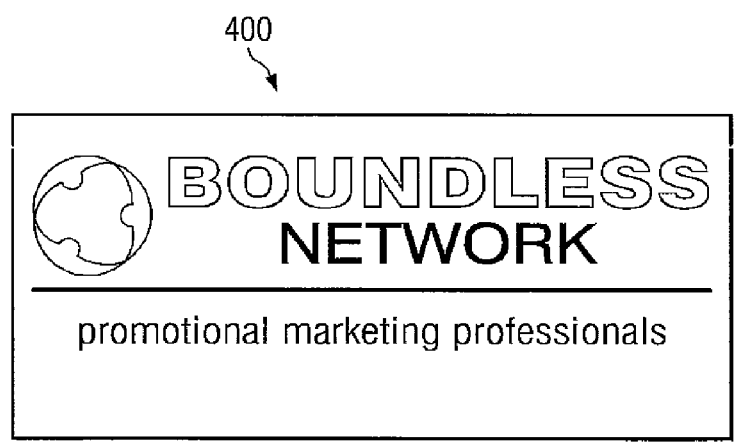
FIG. 4 illustrates an artwork file.

FIG. 3 illustrates data structure 300 which can be used in conjunction with system 100 and method 200 to control access to files 122'. Data structure 300 can include tables 302, 304, 306, and 308 and a query, report, or algorithm 310. FIG. 3 illustrates that data structure 300 can be implemented in a relational database containing metadata regarding files 122' and accounts for users 102 although many other data structures are possible. In some embodiments, the metadata contained in structure 300 could be distributed across system 100. FIG. 3 shows user accounts 320, user classifiers 322, entries 324 for each file 122', file classifiers 326, and access states 328. In data structure 300, tables 302 and 304 are related to each other by join 312 which illustrates that for each user account 320 in table 302, table 304 contains a number (zero or more) of user classifiers 322. Join 314 illustrates that for each file entry 324 in table 306, table 308 contains a number of file classifiers 326. Joins 316 and 318 show that report 310 includes an access state 328 for each permutation of user accounts 320 and file entries 324. In some embodiments, an access state 328 for a combination of a certain user account 324 and a certain file entry 324 can be set to "allow" if any user classifier 322 matches any file classifier 326 for that permutation. If no user classifier 322 matches any file classifier 326, access state 328 can be set to "deny" for that permutation of user account 320 and file entry 324.

User classifiers 322 can be stored along with other user account metadata in a user profile. In some embodiments, file classifiers 326 can be stored with other file metadata in a file allocation table. Classifiers 322 and 326, in some embodiments, may be mirrored into data structure 300 from such locations. In some embodiments, classifiers 322 and 326 may be retrieved from their storage locations.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the following claims and their legal equivalents.

What is claimed is:

1. A system for access to a file, comprising:
   a computing device comprising a processor executing a set of computer readable instructions; and
   a computer readable storage medium for storing a data structure, the data structure readable by instructions executing on a processor and comprising:
   a set of nominal key:value pairs corresponding to a classification selected from the group comprising a geographic location classifier, an industrial classifier, a file classifier and an account classifier;
   a set of files, wherein each file in the set of files has the nominal key:value pair file classifier associated therewith, wherein the nominal key:value pair file classifier is associated with an attribute of the file; and
   a set of user accounts, wherein each user account in the set of user accounts has the nominal key:value pair account classifier associated therewith, wherein the nominal key:value pair account classifier is associated with an attribute of the user account;
   wherein, the instructions are executable to compare the nominal key:value pair account classifier from the set of nominal key:value pair account classifiers with the nominal key:value pair file classifier from the set of nominal key:value pair file classifiers to determine if the attributes of the nominal key:value pair account classifiers matches with the attributes of one or more files in the set of files, and
   wherein the instructions are executable to allow the user accounts from the set of user accounts associated with a matching nominal key:value pair account classifier to modify the files associated with the matching nominal key:value pair file classifier.

2. The system of claim 1 wherein the set of files comprises a first set of files from a user, a second set of files from a customer, a third set of files from a supplier, and a fourth set of files from a catalogue, and
   wherein the sets of files are displayed to the customer on one or more interfaces.

3. The system of claim 1 wherein the set of nominal key: value pairs have object inheritance.

4. A system for access to a file, comprising
   a network;
   a plurality of computers in communication over the network; and
   a memory in communication with the network, the memory comprising:
   instructions executable by a processor; and a data structure, comprising:
- a set of nominal key:value pairs corresponding to a classification selected from the group comprising a geographic location classifier, an industrial classifier, a file classifier and an account classifier;
- a set of files, wherein each file in the set of files has the nominal key:value pair file classifier associated therewith, wherein the nominal key:value pair file classifier is associated with an attribute of the file; and
- a set of user accounts, wherein each user account in the set of user accounts has the nominal key:value pair account classifier associated therewith, wherein the nominal key:value pair account classifier is associated with an attribute of the user account;

wherein, the instructions are executable to compare the nominal key:value pair account classifier from the set of nominal key:value pair account classifiers with the nominal key:value pair file classifier from the set of nominal key:value pair file classifiers to determine if the attributes of the nominal key:value pair account classifiers matches with the attributes of the files in the set of files, and wherein the instructions are executable to allow the user accounts from the set of user accounts associated with the matching nominal key:value pair account classifier to modify the files associated with the matching nominal key:value pair file classifier.

5. The system of claim 4, further comprising an interface for receiving a file, wherein the set of instructions are executable to store the received file in the data structure.

6. The system of claim 5, wherein the file from the set of files are displayed to a user on an interface, wherein said displayed file have a nominal key:value pair file classifier with an attribute that matches an attribute of a nominal key:value pair account classifier.

7. The system of claim 6, wherein the nominal key:value pair file classifiers maintain one or more of hierarchy, dependence, class inheritance and object inheritance.

8. The system of claim 6, wherein the nominal key:value pair account classifiers maintain one or more of hierarchy, dependence, class inheritance and object inheritance.

9. A method for providing access to a file, comprising:
associating the nominal key:value pair file classifier with each file of a set of files, wherein the nominal key:value pair file classifier is associated with an attribute of the corresponding file and the nominal key:value pair file classifier is a set of nominal key:value pairs corresponding to a classification selected from the group comprising a geographic location classifier, an industrial classifier, a file classifier and an account classifier;
associating the nominal key:value pair account classifier with each user account of a set of user accounts, wherein the nominal key:value pair account classifier is associated with an attribute of the corresponding user account; and
comparing a nominal key:value pair account classifier from the set of nominal key:value pair account classifiers with a nominal key:value pair file classifier from the set of nominal key:value pair file classifiers to determine if the attributes of the nominal key:value pair account classifiers matches with attributes of the files in the set of files, and
allowing one or more user accounts from the set of user accounts associated with the matching nominal key: value pair to access the files associated with the matching nominal key:value pair file classifier.

10. The method of claim 9, further comprising
receiving, by an interface, a file; and
uploading the received file to a memory containing a shared repository of the set of files, wherein uploading the file comprises associating one or more nominal key:value pair file classifiers with the file.

11. The method of claim 9, wherein the nominal key:value pair file classifiers maintain one or more of hierarchy, dependence, class inheritance and object inheritance.

12. The method of claim 9, further comprising displaying, on an interface, a list of all files having one or more nominal key:value pair file classifiers that match one or more nominal key:value pair account classifiers.

13. A computer-readable storage medium storing computer-executable program instructions implementing a method of allowing access to a set of files, wherein the computer-executable program instructions comprise:
code for associating the nominal key:value pair file classifier with each file of a set of files, wherein the nominal key:value pair file classifier is associated with an attribute of the file and the at least one nominal key:value pair file classifier is a set of nominal key:value pairs corresponding to a classification selected from the group comprising a geographic location classifier, an industrial classifier, a file classifier and an account classifier;
code for associating the nominal key:value pair account classifier with each user account of a set of user accounts, wherein the nominal key:value pair account classifier is associated with an attribute of the user account; and
code for comparing a nominal key:value pair account classifier from the set of nominal key:value pair account classifiers with a nominal key:value pair file classifier from the set of nominal key:value pair file classifiers to determine if of the attributes for each of the nominal key:value pair account classifiers matches with the attributes of one or more files in the set of files; and
code for allowing user accounts from the set of user accounts associated with the matching nominal key:value pair to access the files associated with the matching nominal key:value pair file classifier.

14. The computer-readable storage medium of claim 13 wherein the instructions further comprise:
code for receiving, by an interface, a file; and
code for uploading the received file to a memory containing a shared repository of the set of files, wherein uploading the file comprises associating one or more nominal key:value pair file classifiers with the file.

15. The computer-readable storage medium of claim 13 wherein the instructions further comprise code for maintaining one or more of hierarchy, dependence, class inheritance and object inheritance for the nominal key:value pair file classifiers.

16. The computer-readable storage medium of claim 13 wherein the instructions further comprise code for displaying, on an interface, a list of all files having one or more nominal key:value pair file classifiers that match one or more nominal key:value pair account classifiers.

17. A system for sharing a file, comprising a computing device having a processor and a computer readable medium for storing a data structure, the data structure readable by instructions executing on the processor and comprising:
a set of nominal key:value pairs corresponding to a classification selected from the group comprising a geographic location classifier, an industrial classifier, a file classifier and an account classifier;

a set of files, wherein each file in the set of files the free-form nominal key:value pair file classifier associated therewith, wherein the free-form nominal key:value pair file classifier is associated with an attribute of the file;

a set of user accounts, wherein each user account in the set of user accounts has the free-form nominal key:value pair account classifier associated therewith, wherein the free-form nominal key:value pair account classifier is associated with an attribute of the user account; and wherein, the instructions are executable to compare a free-form nominal key:value pair account classifier from the set of free-form nominal key:value pair account classifiers with the free-form nominal key:value pair file classifier from the set of free-form nominal key:value pair file classifiers to determine if the attributes for each of the free-form nominal key:value pair account classifiers matches with one or more attributes of the files in the set of files, and wherein the instructions are executable to allow the user accounts from the set of user accounts associated with the matching free-form nominal key:value pair account classifier to modify the files associated with the matching free-form nominal key:value pair file classifier.

18. A system for sharing product files, comprising:

a processor configured to execute instructions;

a computer readable medium, storing a data structure, the data structure readable by instructions executing on the processor and comprising:

a set of nominal key:value pairs corresponding to a classification selected from the group comprising a geographic location classifier, an industrial classifier, a file classifier and an account classifier;

a set of files, wherein each file in the set of files comprises the unstructured nominal key:value pair file classifier associated therewith, wherein the unstructured nominal key:value pair file classifier is associated with an attribute of the file;

a set of user accounts, wherein each user account in the set of user accounts has the unstructured nominal key:value pair account classifier associated therewith, wherein the unstructured nominal key:value pair account classifier is associated with an attribute of the user; and an interface operable to receive a first file from a customer, wherein the interface is operable to display a second file to the customer;

wherein, the instructions are executable to compare the unstructured nominal key:value pair account classifier from the set of unstructured nominal key:value pair account classifiers with the unstructured nominal key:value pair file classifier from the set of unstructured nominal key:value pair file classifiers to determine if the attributes for each of the unstructured nominal key:value pair account classifiers matches with the attributes of the files in the set of files, and wherein the instructions are executable to allow the user accounts from the set of user accounts associated with the matching unstructured nominal key:value pair account classifier to modify the files associated with the matching unstructured nominal key:value pair file classifier.

* * * * *